Figure 1:
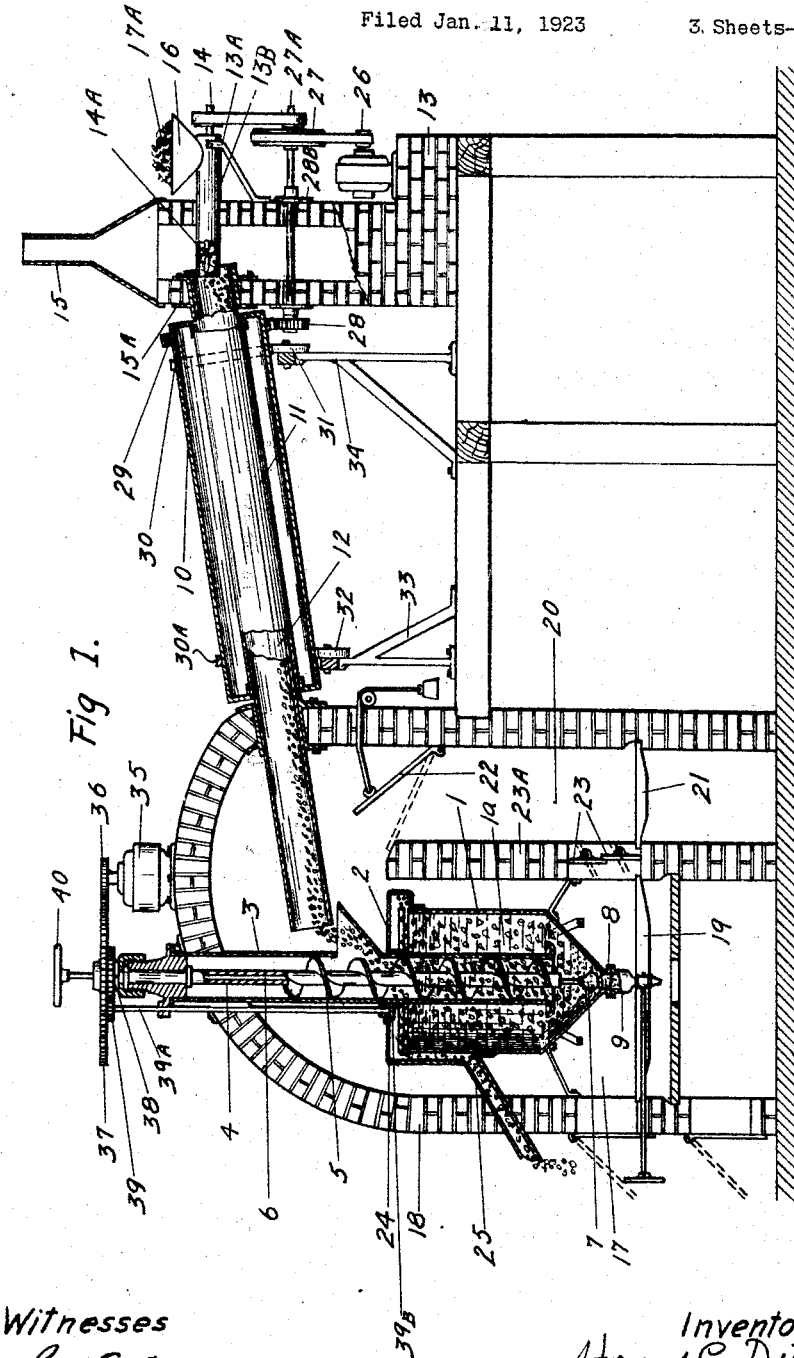

July 14, 1925.

H. C. DIERS ET AL 1,545,814

APPARATUS FOR RECOVERING GOLD AND PRECIOUS METALS

Filed Jan. 11, 1923   3 Sheets-Sheet 1

Witnesses
Geo. E. Frost Jr.
John T. Anderson

Inventors
Henry C. Diers
James W. Greene
By Thomas Silvius
Attorney

July 14, 1925.
H. C. DIERS ET AL
1,545,814
APPARATUS FOR RECOVERING GOLD AND PRECIOUS METALS
Filed Jan. 11, 1923  3 Sheets-Sheet 2
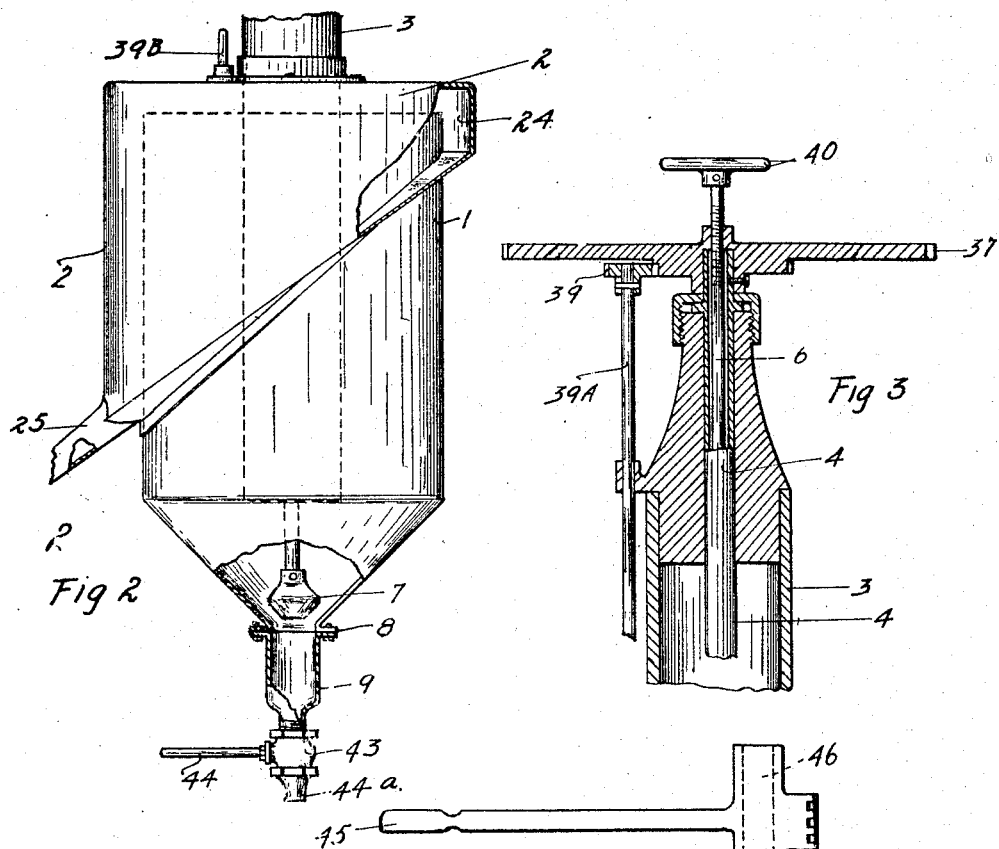
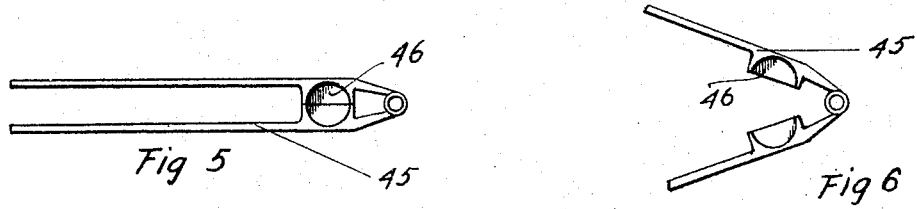
Witnesses
Inventors July 14, 1925. 1,545,814
H. C. DIERS ET AL
APPARATUS FOR RECOVERING GOLD AND PRECIOUS METALS
Filed Jan. 11, 1923 3 Sheets-Sheet 3
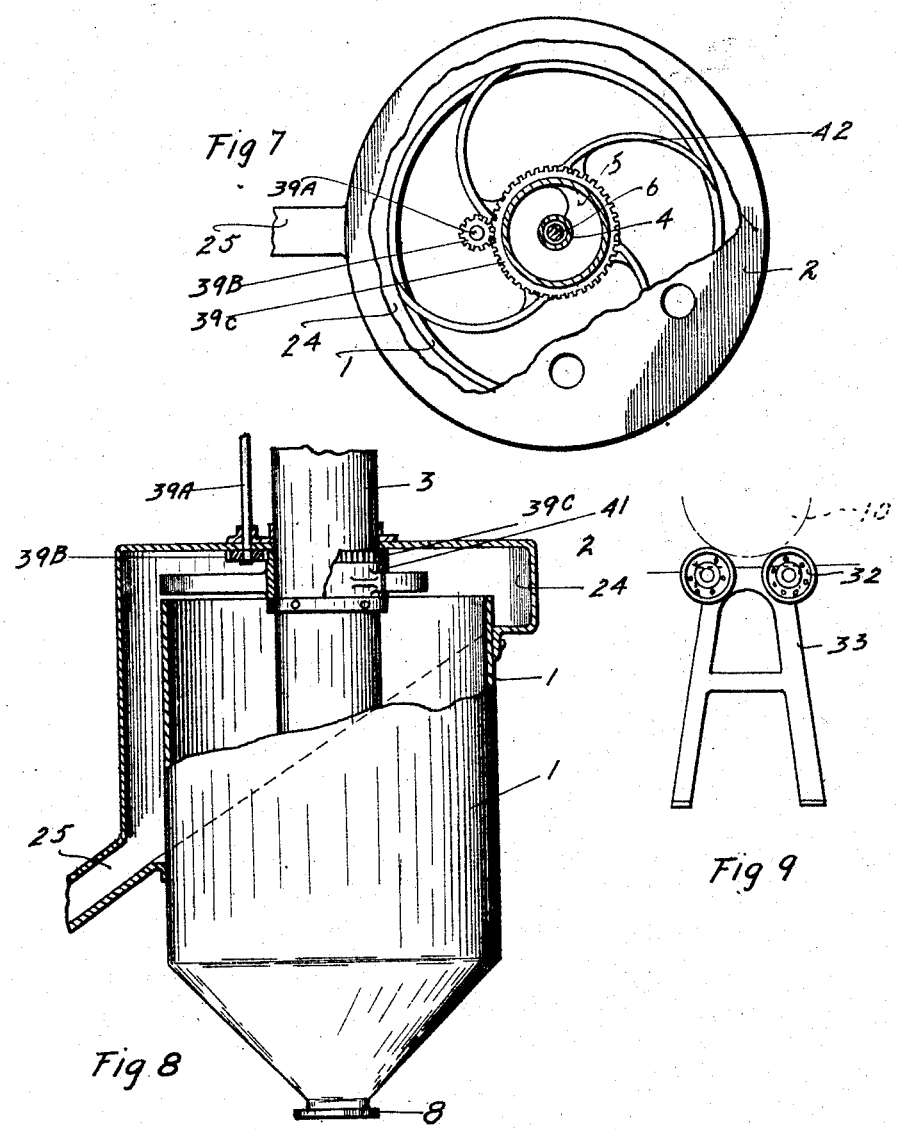

Patented July 14, 1925.

1,545,814

UNITED STATES PATENT OFFICE.

HENRY C. DIERS, OF MARSHFIELD, AND JAMES W. GREENE, OF PORTLAND, OREGON.

APPARATUS FOR RECOVERING GOLD AND PRECIOUS METALS.

Application filed January 11, 1923. Serial No. 612,006.

*To all whom it may concern:*

Be it known that we, HENRY C. DIERS, residing at Marshfield, in the county of Coos and the State of Oregon, and having his residence in the said city and State, and JAMES W. GREENE, residing at Portland, in the county of Multnomah and the State of Oregon, and having his address at 202 Stevens Building, in said city and State, both citizens of the United States, have invented a new and useful Improvement in the Apparatus for Recovering Gold and Precious Metals.

Our apparatus may be described as follows—

The black sands, earthen matter, screenings, ores, placer material, clays, alluvial deposits, or other materials having precious metals in a free state intermingled therewith and therein, is fed or placed within a hopper, having mechanical means provided therein for forcibly carrying the materials from the point or place of deposit at the entrance of the mechanism through heated chambers of a temperature approximating that of a cauldron containing molten lead to which the material is to be conducted in its passage from the entrance to the cauldron containing the molten lead. The material in its heated state is then inducted forcibly below the surface of the molten lead and allowed to flow from the conducting means that terminates somewhat below the surface of the lead in thin layers and permitted to rise to the surface of the lead by passing through baffles to thoroughly disseminate the materials in their floating action to the surface, and in so doing those materials having a specific gravity higher than that of the liquid lead will sink to the bottom of the cauldron where simple mechanical means are provided for the tapping off of those metals that have sunk to the bottom of the cauldron, and those that have a specific gravity less than that of the molten lead will rise to the surface, at which point they are removed from the surface by boiling over and falling into a hopper or chute having sloping sides of a sufficient angle to cause them to flow from the point of deposit.

The apparatus consists of a furnace provided with the usual grates, linings, draft regulators, and stacks, suspended within the furnace is a cauldron made of a heat resisting material of a noncombustible nature and having projected therein a cylindrical member having a conveying means operating therein for the purpose of conveying the material to be treated from the point of deposit at the point above the surface of the molten lead to a point substantially below the surface of the molten lead, at this point the material is diffused and permitted to float to the surface. The material to be treated and to have the precious metals removed therefrom is first deposited in a hopper at an entrance to the heat chamber and is fed by gravity or other means into a rotating cylinder through which the heat also passes from the furnace to the stack. In the passage of the material from the hopper to the point of entrance into the cauldron the material is heated to the approximate heat of the molten lead in the cauldron and at the same time all combustible materials will have been consumed so that only the noncombustible materials will be fed into the molten lead bath for treatment.

In the accompanying drawings, Fig. 1 is a section view through the assembled plant partially broken away at different points to facilitate the understanding of the construction. Fig. 2 is a detached assembly of the cauldron partially broken away. Fig. 3 is a partial cross section of the cylinder and the feeding mechanism. Fig. 4 is a side view of the mould placed at the lower end of the cauldron to facilitate the tapping off of the precious metals that have been recovered, Fig. 5 is a plan view of the same. Fig. 6 is a partially open view of the same to illustrate the hinged action of the mold. Fig. 7 is a plan view of the cauldron and partially broken away to illustrate the means for removing the materials that have been treated and that have risen to the surface after treatment. Fig. 8 is a side view of the same partially broken away to better illustrate the inner construction of the same and Fig. 9 is a detached view of the trunnion construction for supporting the cylinder and upon which the same is rotated.

Similar letters and numerals refer to similar parts throughout the several views and a detailed and complete description and disclosure will now be made of our invention by reference to the drawings in detail.

1 is the cauldron shell, or bowl, in which molten lead is placed, or maintained, as illustrated and shown at 1ª. 2 is a covering for the same and 3 is a cylindrical tube that passes from the exterior through the cover 2 and passes below the surface of the molten lead and well to the bottom of the cauldron terminating at its lower end in a flared shape to better diffuse the discharged material. Operating within tube 3 is a conveyor 4 which is shown in the form of a screw conveyor but it is apparent that other forms of conveyors may and can be used. Passing through the center of the conveyor 4 is a rod 6 terminating at its bottom end in a tap or plug 7 upon the lowering of which the lower or bottom outlet of the cauldron may be temporarily closed while the tapping off of the accumulated metals to be recovered is accomplished. 8 is a flange member on the lower side of the cauldron to which is attached bowl 9. 10 is the outer jacket of the revolving cylinder 11 through which the materials to be treated are fed. 12 is the inner lining of the same, 13 the brick work supporting the outlet for the heated gases and the products of combustion being discharged from the upper end of the revolving cylinder and 13ª is a bracket or support for the outer end of the feed pipe 13ᵇ. 14 is the worm conveyor shaft operating within the feed pipe and having mounted thereon worm 14ª which feeds the material 17ª placed within the hopper 16 and discharges the same within the revolving cylinder, the material itself causing the seal to prevent the escape of the heated gases through the feed pipe and forces the same up the stack 15. 15ª is a metal collar surrounding the revolving cylinder and is placed in the brick work at the time the same is set in place. 18 is the brick work surrounding the main furnace and 17 is the combustion chamber. 19 represents the grate bars for supporting the materials of combustion or the fuel for heating the furnace and 20 is a secondary chamber which may be used for additional heat and as a regulating means for temperature control. 21 are grate bars in the chamber 20 and 22 is a damper located near the top of chamber 20. 23 are doors located in cross or bridge wall 23ª for the admission of heat or the passage of heat from chamber 20 to 17 or the passage in the other direction. 24 is the space between the covering 2 and the bowl 1 and has sloping sides terminating in a delivery spout 25 for the egress of the treated materials.

26 is a power unit which is here shown as a motor, but it is apparent that any form of a prime mover may be used. 27 is a pulley to which the prime mover is attached by belt or other suitable means, the pulley being keyed or attached to shaft 27ª and is suitably placed in bearings 28ᵇ; also mounted upon the shaft is a gear pinion 28 meshing with gear 29 which is secured to the cylinder to be rotated and the prime mover transmits a rotating motion to the cylinder through a suitable chain of transmission as here shown but it will be apparent that other and suitable forms of transmissions may be used and we do not wish to be limited to the form here shown. Surrounding the rotating cylinder are trunnion bands 30 and 30ª which roll upon trunnion rollers 31 and 32, these rollers being journaled and supported in place by supports 33 and 34. 35 is a prime mover, here shown as a motor but which may be of other form, for the turning of a chain of transmission, here shown in the form of a pinion 36 attached to the shaft of the prime mover, a main gear 37 attached to the feed screw for carrying the heated material below the surface of the liquid bath of lead. A gear 38 integral with gear 37 meshes with gear 39 which is secured to shaft 39ª and having geared thereto pinion 39ᵇ meshing with the toothed ring 39ᶜ which is integral with spider 41 and having vanes 42 attached thereto the purpose being as the treated materials having a specific gravity lighter than that of the liquid lead rise to the top the revolving of this spider will remove the risen materials.

To the shaft 6 for operating tap or plug 7 is hand wheel 40.

From the above description and drawings a complete disclosure of the principle of operation of our invention has been made so complete that any one skilled in the art can apply the same in actual practice. The same consists in the simplest form of an enclosed kettle having an outlet in the bottom of the same and made of a heat resisting material surrounded in a heat chamber having means for regulating the amount of heat to be maintained within the chamber, the kettle to have sufficient strength to maintain a liquid mass of molten lead within the same and means for conducting the materials having the free precious metal below the surface of the molten liquid lead, and it may here be stated that should the precious metals have a melting point below that of the lead the same may be recovered after having gone into solution by melting therewith by chemical or other means, and means for conducting the materials to be treated through rotating cylinders surrounded by a heat chamber to preheat the same to the approximate heat of that maintained within the molten lead, and means for conducting the materials from the exterior of the heated chamber into the same and maintaining a seal to prevent the escapement of the heated gases excepting by or into a smoke stack maintained for conducting the products of combustion away from the operation, and finally a mechanical means for removing the treated materials away from the heat chamber and the surface of the liquid lead. Operating means are shown for supplying the motive power for operating the different units, but we do not wish to be limited to the use of the motor prime movers as shown. 43 is a valve which is operated by valve stem 44 and having a cone shaped outlet 44ª located and attached to the bottom flange of the valve. Adapted for receiving the materials to be released by the opening of the valve is a mould member 45 which is hinged and having a mould chamber 46 for receiving the deposited material, the purpose being that the mould may be opened about the hinge and the deposited material be removed when in a cooled condition.

Having thus described our invention we wish to make the following claims therefor:

1. In the recovery of precious metals, a cauldron containing molten lead and having an opening within its base, means for tapping off, therefrom, the precipitated metals of a specific gravity heavier than that of the lead, means located above the cauldron for operating the tapping off means, means for maintaining within the cauldron molten lead, and means surrounding the cauldron for maintaining temperatures sufficient to maintain the lead in a molten condition, means for forcing materials to be treated below the surface of the molten lead, means for removing the immersed materials that rise to the surface of the molten lead that have been immersed, means for preheating the materials to be immersed before immersion and means for forcing the materials to be preheated into the preheating chamber all for the purpose as specified and described.

2. In the recovery of precious metals, a cauldron containing molten lead, means for maintaining the lead in a molten condition, a housing inclosing the cauldron, a cylindrical tube depending from the upper end of the housing and extending into the cauldron, a tubular spiral conveyor in the cylindrical tube, means for delivering preheated material to the tube, said cauldron having a tap-off opening in its bottom having a control plug which is operable from a point adjacent the upper end of the tube, and means adjacent the upper end of the tube for operating the plug.

3. In the recovery of precious metals, a cauldron containing molten lead, means for maintaining the lead in a molten condition, a housing inclosing the cauldron, a cylindrical tube depending from the upper end of the housing and extending into the cauldron, a tubular spiral conveyor in the cylindrical tube, means for delivering preheated material to the tube, a depending extension carried by the lower end of the cauldron, a valve controlled outlet at the lower end of the extension, and means operable from a point adjacent the upper end of the tube for controlling the deposit of material in the cauldron extension.

4. In the recovery of precious metals, a cauldron containing molten lead, means for maintaining the lead in a molten condition, a housing inclosing the cauldron, a cylindrical tube depending from the upper end of the housing and extending into the cauldron, a tubular spiral conveyor in the cylindrical tube, means for delivering preheated material to the tube, a depending extension carried by the lower end of the cauldron, a valve controlled outlet at the lower end of the extension, a slidable rod in the tubular conveyor, and means carried by the lower end of the rod to control the deposit of material in the cauldron extension.

HENRY C. DIERS.
JAMES W. GREENE.